(12) United States Patent
Winkler et al.

(10) Patent No.: US 6,753,863 B1
(45) Date of Patent: Jun. 22, 2004

(54) SYSTEM AND METHOD FOR STREAMING REAL TIME ANIMATION DATA FILE

(75) Inventors: Yair Winkler, Keysaria (IL); Yaron Riany, Ramat Efaal (IL)

(73) Assignee: TechImage Ltd., Herzella (IL)

( * ) Notice: Subject to any disclaimer, the term of this patent is extended or adjusted under 35 U.S.C. 154(b) by 198 days.

(21) Appl. No.: 09/599,784

(22) Filed: Jun. 22, 2000

(51) Int. Cl.$^7$ .............................................. G06T 17/00
(52) U.S. Cl. ...................................................... 345/473
(58) Field of Search ................................ 345/418, 420, 345/473, 474, 475

(56) References Cited

U.S. PATENT DOCUMENTS

| | | | |
|---|---|---|---|
| 5,495,576 A | * 2/1996 | Ritchey | 345/425 |
| 5,574,836 A | * 11/1996 | Broemmelsiek | 345/427 |
| 5,604,848 A | * 2/1997 | Harada et al. | 345/419 |
| 6,072,496 A | * 6/2000 | Guenter et al. | 345/419 |
| 6,144,375 A | * 11/2000 | Jain et al. | 345/302 |
| 6,181,345 B1 | * 1/2001 | Richard | 345/419 |
| 6,292,791 B1 | * 9/2001 | Su et al. | 706/23 |

* cited by examiner

Primary Examiner—Cliff N. Vo
(74) Attorney, Agent, or Firm—Katten Muchin Zavis Rosenman

(57) ABSTRACT

A method for of transferring and receiving 3D image motion through communication network based upon virtual behavioral model wherein the virtual model represents the 3D image structure and enables to simulate 3D image motion according to structure components positions and movements programmed according to behavioral set of rules. Processing the 3D image according to motion capture method, capturing time based 2D data sets representing specific partial Key Fragments of the 3D image. Transferring the said virtual model through the network, transferring sequential sets of the said key fragments of each 2D data set through the network. Creating visual 3D image motion display according to the transferred virtual model, relating the transferred Key Fragments to the respective components of the said model structure and determining the respective components positions according to the related Key Fragments, and applying the behavioral rules of the virtual model regarding all structure components to determine their new positions according to the said position of the respective Key Fragments.

15 Claims, 5 Drawing Sheets

Techimage LTD original 3D images +marked key fragment 3D structure according virtual model Simulated 3D image according virtual model+key fragments

SYSTEM AND METHOD FOR STREAMING REAL TIME ANIMATION DATA FILE

FIELD OF THE INVENTION

The invention relates to a method of building animation data files, the data files structure, the transfer of data from such files for the purposes of interactive delivery of animation data to an end user, and the efficient display thereof to an end user, over a network, particularly global computer networks connected by common protocols, such as the Internet.

BACKGROUND OF THE INVENTION

For purposes of this disclosure, by the term "network" is meant include at least two computers connected through a physical communication line which can be hardwired, or virtual, such as satellite, cellular or other wireless communications. Computer can mean a personal computer, server or other similar-type device capable of receiving, transmitting, and/or manipulating data for such purposes as, but not limited to, display on a display unit connected thereto.

Today such animation transmissions and displays are inefficient due to insufficient bandwidth capacity. The data transfer rates necessary for multimedia applications are measured in the range of tens to hundreds of kilobytes per second, whereas the average data transfer lines in such networks, for an end user having a typical analog modem, can only handle a few kilobytes per second (less than 5). Thus, interactive transmission and display of multimedia applications, such as animation, is almost impossible because of the physical limitations of existing wiring when considering present-day modem compression techniques.

One solution to this problem of insufficient bandwidth is for the user simply to sit and wait for a sufficient amount of information to have been delivered to begin the animation display with confidence so that it can be completed without running out of information in mid-display.

Another solution is to redesign either the sequence the content of the animation data or both so that the data delivery is either slower or less rich. For example, a display of merely ornamental graphics could be delayed or removed to make room for the earlier delivery of more strategic information. Alternatively, a media object may be degraded (e.g. sampling rate reduced) to make the object less data-rich.

A yet further solution is to pre-load information in advance of its being needed by the animation script. This solution may be enabled using excess bandwidth in early parts of a particular script. This may be done on an individual script basis, alternatively, when the system knows specifically that a later script will be played, information for that later script may be pre-loaded on the user's terminal device using excess bandwidth during an earlier script.

Whichever solution is chosen, it would be highly advantageous to have a computer tool that enables delivery of information to be scheduled so as to optimize available bandwidth, while still enabling the playing of a multimedia script with minimal startup delay and no interruptions. Using this tool, the system designer would be able to orchestrate animation scripts linked to an optimum delivery schedule of underlying media objects. When insufficient bandwidth is available for an instantaneous playback, the designer would further be able to make choices among the alternatives described above, such as delaying startup, redesigning script sequence and/or content, or pre-loading information, so as to make full and best use of available bandwidth.

There have already been proposed a certain solution in attempt to overcome these deficiencies. U.S. Pat. No. 5,909,218 refers to a mechanism for defining a complex structure such as a human being by a skeleton structure, compressing, restoring and transmitting/receiving the reference position of a specified skeleton and the motion information of each joint position of the skeleton. This solution is limited to transferring animation display of rigid bodies based upon a skeleton structure, thus the animation display is mechanical and unrealistic.

It is thus a prime object of the invention to avoid at least some of the limitations of the prior art and to provide a system, data format, and method of conveying and operating on data over a network to enable efficient 3D motion play, including display, particularly of elastic 3D images motion.

SUMMARY OF THE INVENTION

A system and method for of transferring 3D image motion through a communication network comprising the steps of: configuring a virtual model to represent the 3D image structure and to simulate the 3D image motion, wherein the structure components positions and movements are programmed according to behavioral rules, capturing time based 2D data sets representing specific partial Key Fragments of the 3D image, transferring the virtual model through the network, transferring sequential sets of the said Key Fragments of each 2D data set through the network, creating visual 3D image display according to the transferred virtual model, relating the transferred Key Fragments to the respective components of the said model structure, determining the respective components positions according to the related Key Fragments, and applying the behavioral rules of the virtual model regarding all structure components to determine their new positions according to the said position of the respective Key Fragments.

BRIEF DESCRIPTION OF THE DRAWINGS

These and further features and advantages of the invention will become more clearly understood in the light of the ensuing description of a preferred embodiment thereof, given by way of example only, with reference to the accompanying drawings, wherein.

DETAILED DESCRIPTION OF THE PREFERRED EMBODIMENTS

The embodiments of the invention described herein are implemented as logical operations in a computing network system. The logical operations of the present invention are preferably presented (1) as a sequence of computer implemented steps running on the computing network system and (2) as interconnected machine modules within the computing network system. The implementation is a matter of choice dependent on the performance requirements of the computing network system implementing the invention. Accordingly, the logical operations making up the embodiments of the invention described herein are referred to variously as operations, steps, or modules.

Figure 1:
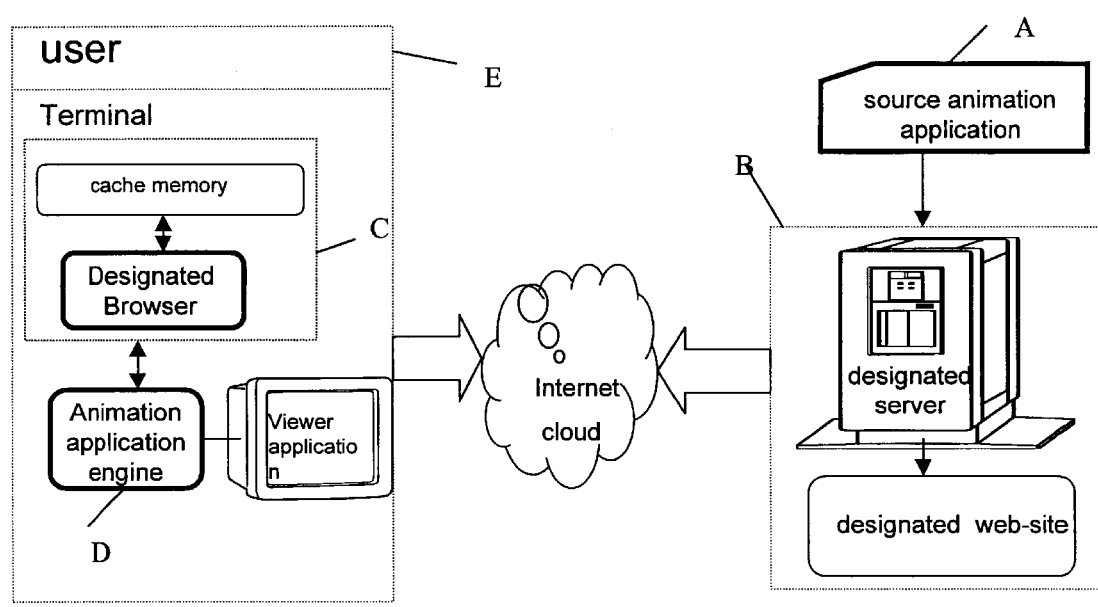
FIG. 1 is a general schematic representation of the environment in which the present invention is practiced.

FIG. 1 illustrates the operating environment in which the present invention is used. As seen in FIG. 1 the user E is connected to an electronic network, preferably the Internet via designated browser C in a conventional manner.

Let us assume that the user E visits a web site wherein animation motion pictures are available for display. According to prior art after selecting a specific animation display located on a source server to be viewed, the user request is processed by any conventional browser and transferred via local server to remote servers. Once the request reaches the source server, the animation data is processed to fit the communication bandwidth and transferred back to the end user terminal.

One conventional transformation method of all animation components uses a "frame-by-frame" technique. The speech signal is analyzed and aligned to a timed sequence of image frames. This technique lacks the ability to resynchronize in real time to perform what is called "adaptive synchronization." As a result, unanticipated real time events can annoyingly cause the synchronization to be lost. Moreover, processing frames where each frame includes full animation components, demands large capacity bandwidth, as a consequence, the animation display is slow and sometimes unrealistic.

Figure 2:
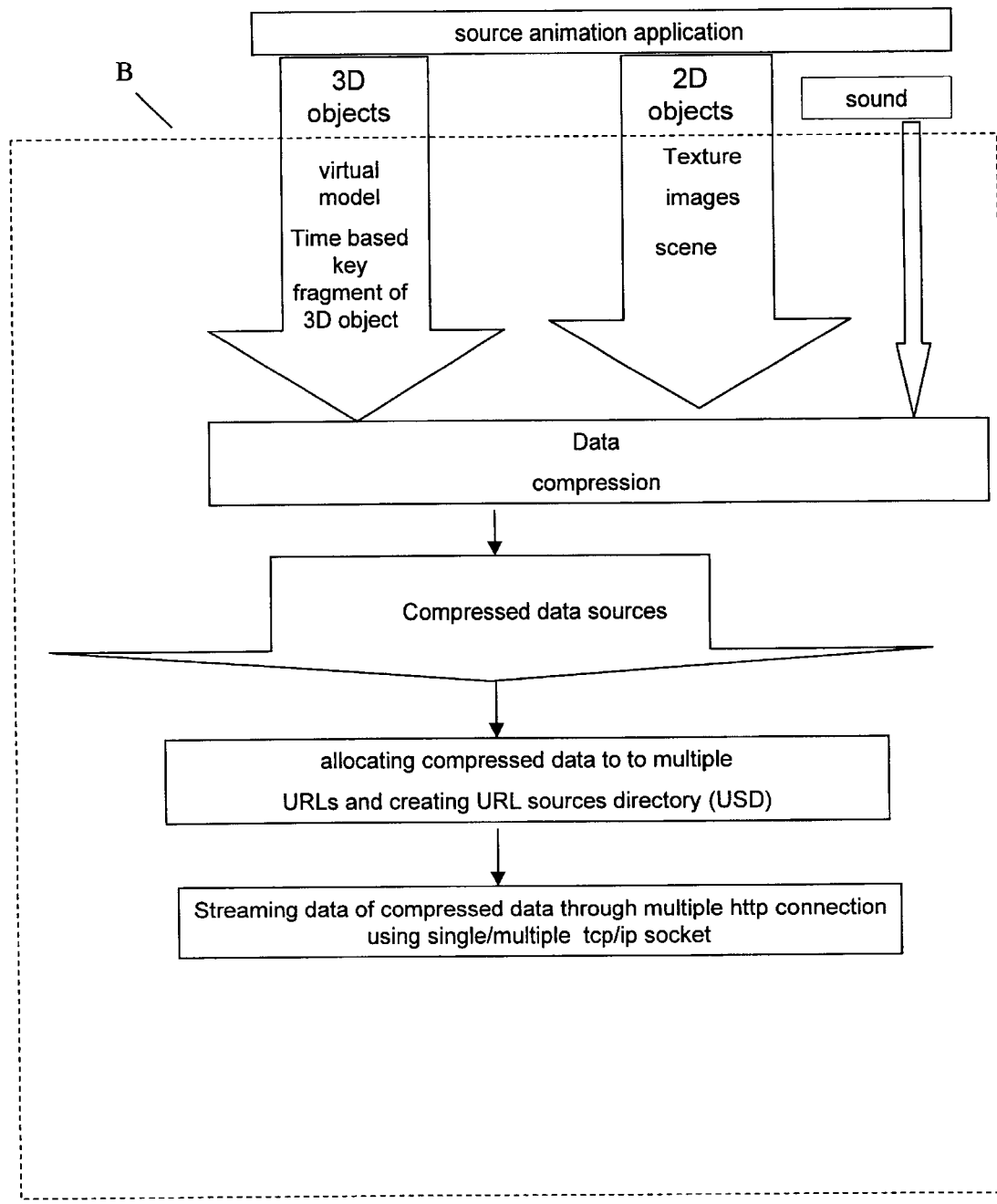
FIG. 2 is a scheme illustrating the method of preparing source animation data for transfer according to the present invention.

According to the present invention, it is suggested, as illustrated in FIG. 2, to design the animation presentation in a designated data format, comprised of multiple layers, classifying each layer components as 2D object (e.g. background scene, texture and still images) and 3D objects e.g. moving figures. The 3D object's source can be real 3D entity e.g. human face (see illustration of original face image in FIG. 5) or an imaginary entity like cartoon images. The 3D object's source is analyzed to create a virtual model—see illustration of virtual model in FIG. 5 (e.g. Famous geometrical model™, Digital Faceworks™ anatomical models) representing the objects structure and simulating their motion. This simulation is based upon behavioral set of rules enabling to imitation of the movements of the structure components, the behavioral rules are defined according to geometrical methodologies or (natural) anatomical motion mechanism. Each virtual model is constructed to simulate specific type of entity such as human or animal bodies and faces. Designated animation application (e.g. Softimage™) can use such virtual models of a certain object type to generate a realistic motion variation of different body or face positions. Let us assume we have a virtual model representing the anatomical structure of a certain type of human face, this model comprise the whole organic structure of the head including all muscles and bones. Each motion of the facial can be interpreted as a reaction of muscles movements. These features of the virtual model enable to simulate the motion of the whole face expression out of partial fragments or movements of the face parts. For example, inserting into the virtual model a partial information of the lips movements (e.g. indicating a smile) will be interpreted as full expression of a smiling face emphasizing the movements of the face parts such as cheeks, chin, eyes etc.

Figure 5:
FIG. 5 is a visual illustration of the imaging process according to the present invention.
Figure 5:
Figure 5:
Figure 5:
Figure 5:
Figure 5:
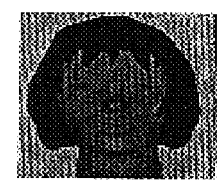
Figure 5:
Figure 5:
Figure 5:

Some possible techniques for implementing the process as described above are known as motion capture, enabling creation of time based 2D data sets containing positional data of the 3D objects e.g. key points depicting face fragments such as lips (see illustration of marked key points on original image face in FIG. 5). Positional data representing the same fragments of the 3D images are selected for each data set of the 3D object motion, this positional data is analyzed by the virtual model according to behavioral set of rules to reconstruct the full 3D image. For example when applying the anatomical virtual model, the above described techniques enable the selection of partial fragments of a face such as the lips of each 3D image and analysis of the positional data of respective data sets to determine the new positions of the cheeks, eyes etc according to behavioral set of rules.

The method as illustrated in FIG. 2, is based upon the classification of animation data objects, each of the components is processed and compressed individually using appropriate techniques to achieve maximum exploitation of bandwidth capacity. The compressed data objects are allocated to multiple URL locations. In order to maintain flow control of the different components, it is necessary to create a directory file containing all the URL locations. The different compressed data objects are transmitted by using multiple HTTP connections, as a result, the different animation components are transferred through parallel net communication routes.

Using the animation formats as described above and transferring separately each animation component has several advantages. First, the virtual model of each object is transferred only once before starting the animation display, while the delivering of dynamic data of each 2D data set demands minimal bandwidth capacity. Second, one specific virtual model can be used for many different animation, in case the model required for the next animation display has already been downloaded for the use of other animation displays, there are significant savings of delivery process time and required bandwidth capacity as a result. The same advantage is achieved for the other animation components appearing in more than one animation display. Third, the possibility of transferring the animation data through multiple HTTP connection reduce the traffic congestion through the net and result more efficient and less time consuming downloading process.

Figure 3:
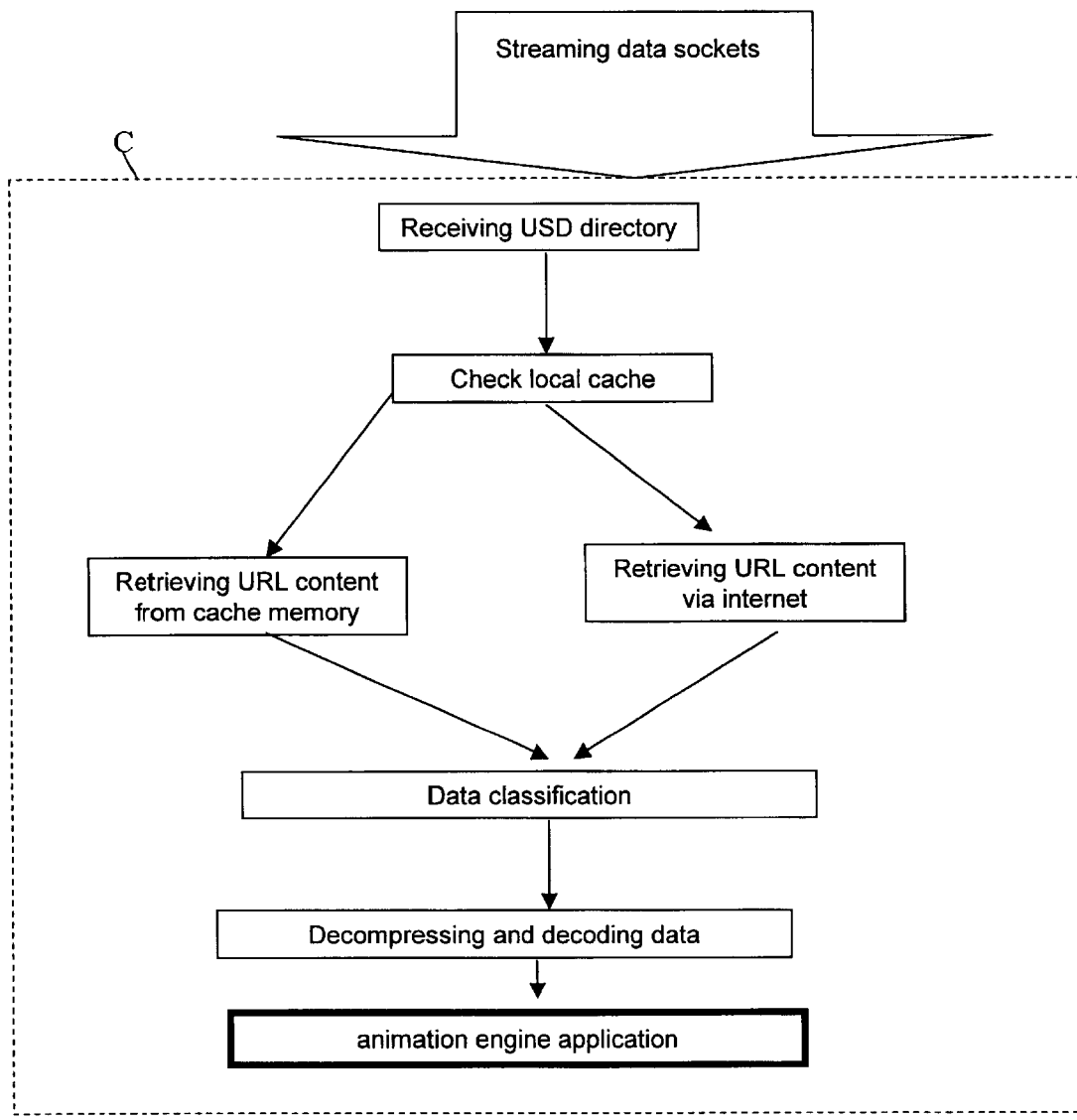
FIG. 3 is a flow-chart of transferring the animation data via network to the end user.

The flow chart in FIG. 3 describes the process of receiving the animation display from the user point of view. The process clarifies and specifies the techniques of implementing the second advantage as described above. After the user selects one animation display, he receives in response the appropriate URL directory (USD). Each URL identifies specific animation components. Hence if the PC memory of the user already contains one of the components, as identified by its URL, there is no need to request this specific component from external sources. The same principle is applied when the request for each component is transferred along the route of the Internet network. For better understanding of this principle, the conventional process of proxy servers will be explained herein: when an internet user requests a new document from a proxy server, the proxy server copies the document from the origin server to its local file system in addition to sending the document to the user. When another request comes for the same document, the proxy server returns the document from the cache if the cached copy is still up to date. If the proxy server determines that the document may be out of date, it performs an up-to-date check from the remote origin server and refreshes the document, if necessary, before sending it to the user. Proxy servers usually store just the most recently requested data files.

Each of the animation components can be treated as HTTP-documents identified by its URL location. When a proxy server receives the requests from the user designated browser C (as generated according to the URL directory), the cache memory is explored. If the requested component is available, the specific request is not transferred any further. (unless it needs to be updated). The designated browser C controls the management and timing of the request of different components. Hence, each component has its respective priority. For example the virtual model should be delivered before the dynamic key fragments of each data set.

Figure 4:
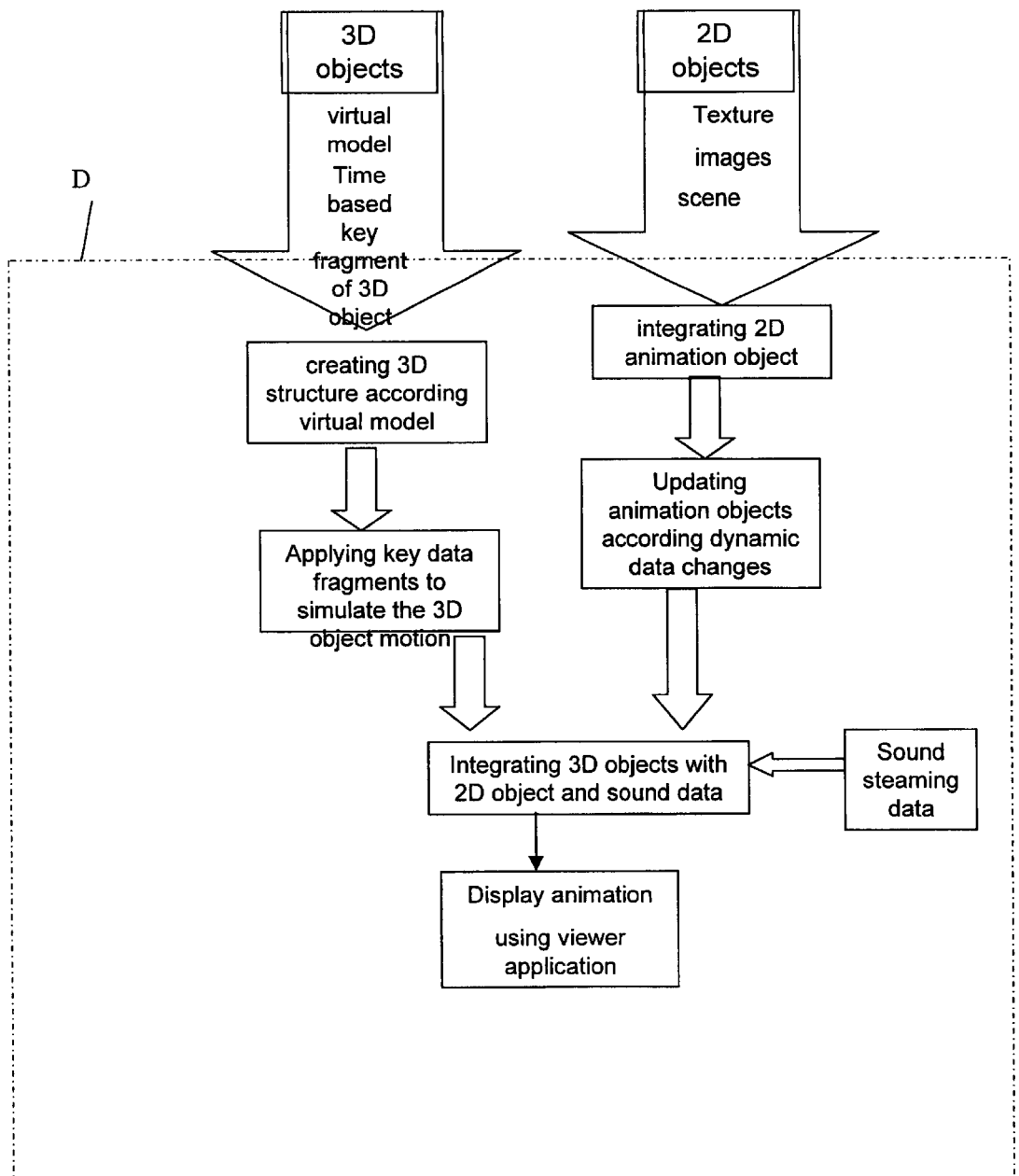
FIG. 4 is a flow-chart of integrating animation data for display.

All delivered components are detected to identify their type (e.g. virtual model) and decompressed accordingly. After all the necessary components reached the user PC, they are further processed by Animation application engine D as illustrated in FIG. 4. The 3D objects of the animation are treated separately, the virtual model is analyzed by the engine software application and the model is converted into specific structure format e.g. anatomical structure creating full 3D muscles model. Now the model can be manipulated according to the respective behavioral rules based upon time based data fragments of each 2D data set, generating visual animation display of the desired body or face motion (see illustration of the simulated visual animation display in FIG. 5).

Once completing the process relating the 3D object, the static components e.g. scene background, still images etc. are integrated together to fit in the respective animation frames and create the full visual animation display.

The present invention as described above provides an efficient method, enabling an end user interactive and quick access to animation data files stored on remote network servers.

While the above description contains many specifities, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. A method for transferring 3D image motion through a communication network said method comprising the steps of:
    configuring a virtual model to represent the 3D image structure and to simulate the 3D image motion, wherein the structure components positions and movements are programmed according to a behavioral set of rules;
    capturing time based 2D data sets representing specific and partial Key Fragments of the 3D image;
    transferring said virtual model through the network;
    transferring sequential sets of the said Key Fragments of each 2D data set through the network;
    creating visual 3D image display according to the transferred virtual model;
    relating the transferred Key Fragments to respective components of the said model structure;
    determining respective component's positions according to the related Key Fragments;
    applying the behavioral rules of the virtual model regarding all structure components to determine their new positions according to the said position of the respective components position.

2. The method of claim 1, wherein the 3D images source is a real physical entity.

3. The method of claim 1, wherein the 3D images source is an imaginary image comprising a cartoon entity.

4. The method of claim 1, wherein the pre-defined set of rules is based upon an anatomical motion mechanism.

5. The method of claim 1, wherein the pre-defined set of rules is based upon an kinematics motion mechanism.

6. The method of claim 1, wherein each Key Fragments contains key points of specific image part.

7. The method of claim 1 further, wherein the 3D image motion is transferred from a source server to a designated terminal said method further comprising the steps of:
    identifying the virtual models and the Key Fragments of each 2D data set (Animation Components) by address locators;
    storing the animation components in local terminals or servers of the network;
    managing the transfer of the animation components to the designated terminal from the nearest locations according to their address locators.

8. The method of claim 7, where in the address locators are URLs in an internet network.

9. The method of claim 7, further comprising the steps of:
    creating a directory list ("Directory") of address locators all relating to one continued presentation of 3D image motion ("Motion Picture");
    transferring the directory from the source server to the designated terminal;
    managing the transfer of a motion picture to a designated terminal according to transferred directory's address locators.

10. A system for transferring 3D image motion through communication network from source server to user terminal, said system comprising:
    modeling application enabling to configure virtual model representing the 3D image structure and simulating the 3D image motion, wherein the structure components positions and movements are programmed according to a behavioral set of rules;
    image processing application enabling to capture time based data sets of 2D image representing specific and partial Key Fragments of the 3D image;
    communication line for transferring said virtual model and sequential sets of the said Key Fragments of each 2D data set through the network;
    animation application enabling to create visual 3D image display according to the transferred virtual model and applying the behavioral rules of the virtual model regarding all structure components to determine their new positions according to the position of the respective components based on the related Key Fragments.

11. The system of claim 10, wherein the 3D images source is a real physical entity.

12. The system of claim 10, wherein the 3D images source is an imaginary image comprising a cartoon entity.

13. The system of claim 10, wherein the pre-defined set of rules is based upon an anatomical motion mechanism.

14. The system of claim 10, wherein the pre-defined set of rules is based upon an kinematics motion mechanism.

15. The system of claim 10, wherein each Key Fragments contains key points of specific image part.

* * * * *